US009759141B2

(12) United States Patent
Kanayama et al.

(10) Patent No.: US 9,759,141 B2
(45) Date of Patent: Sep. 12, 2017

(54) CONTROLLING APPARATUS FOR ENGINE (71) Applicant: MITSUBISHI JIDOSHA KOGYO KABUSHIKI KAISHA, Tokyo (JP)

(72) Inventors: Kuniki Kanayama, Tokyo (JP); Satoshi Nakazawa, Toyko (JP); Koji Kondo, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 14/727,289

(22) Filed: Jun. 1, 2015

(65) Prior Publication Data

US 2015/0260114 A1 Sep. 17, 2015

Related U.S. Application Data (63) Continuation of application No. PCT/JP2013/080190, filed on Nov. 8, 2013.

(30) Foreign Application Priority Data

Dec. 17, 2012 (JP) .................................. 2012-274850

(51) Int. Cl.
*F02D 41/00* (2006.01)
*F02D 41/14* (2006.01)
(Continued)

(52) U.S. Cl.
CPC ....... *F02D 41/0007* (2013.01); *F02D 41/005* (2013.01); *F02D 41/0072* (2013.01);
(Continued)

(58) Field of Classification Search
CPC ............. F02D 41/0007; F02D 41/0005; F02D 41/0072; F02D 41/0077; F02D 41/1401;
(Continued)

(56) References Cited

U.S. PATENT DOCUMENTS 6,148,616 A 11/2000 Yoshida et al.
6,272,859 B1 * 8/2001 Barnes .................... F02B 37/24
60/602
(Continued)

FOREIGN PATENT DOCUMENTS

CN 101331302 A 12/2008
EP 1 081 353 A1 3/2001
(Continued)

OTHER PUBLICATIONS

Extended European Search Report mailed Aug. 8, 2016 for European Patent Application No. 13864065.1.
(Continued)

*Primary Examiner* — Audrey K Bradley
(74) *Attorney, Agent, or Firm* — Birch, Stewart, Kolasch & Birch, LLP (57) ABSTRACT A first recirculation system includes a first adjuster to adjust the exhaust-gas flow rate in a first path connecting an upstream position of a turbine of a VG turbocharger to a downstream position of a compressor. A second recirculation system includes a second adjuster to adjust the exhaust-gas flow rate in a second path connecting a downstream position of the turbine to an upstream position of the compressor. A recirculation controller switches between a single use activating the first or second recirculation system and a combination use activating both systems by controlling the adjusters. A pressure controller executes feedback control of an intake-system pressure through adjusting the opening of vanes, and executes feedforward control without the feedback control during a predetermined period from the switching from the single use to the combination use.

17 Claims, 5 Drawing Sheets (51) Int. Cl.
*F02M 26/05* (2016.01)
*F02M 26/06* (2016.01)
*F02M 26/07* (2016.01)
*F02B 37/22* (2006.01)
*F02B 29/04* (2006.01)
*F02M 26/22* (2016.01)

(52) U.S. Cl.
CPC ....... *F02D 41/0077* (2013.01); *F02D 41/144* (2013.01); *F02M 26/05* (2016.02); *F02M 26/06* (2016.02); *F02B 29/04* (2013.01); *F02B 37/22* (2013.01); *F02D 41/1401* (2013.01); *F02D 2041/0017* (2013.01); *F02D 2041/141* (2013.01); *F02D 2200/0406* (2013.01); *F02M 26/22* (2016.02); *Y02T 10/144* (2013.01); *Y02T 10/47* (2013.01)

(58) Field of Classification Search
CPC ........... F02D 41/144; F02D 2041/0017; F02D 2041/141; F02D 2200/0406; F02M 26/05; F02M 26/06; F02M 26/22; F02B 29/04; F02B 37/22; F02B 37/24; Y02T 10/144; Y02T 10/47
See application file for complete search history.

(56) References Cited

U.S. PATENT DOCUMENTS

| | | |
|---|---|---|
| 8,630,787 B2 | 1/2014 | Shutty et al. |
| 2005/0178123 A1 | 8/2005 | Uchiyama et al. |
| 2007/0246028 A1 | 10/2007 | Fujita et al. |
| 2009/0132153 A1 | 5/2009 | Shutty et al. |
| 2011/0010079 A1 | 1/2011 | Shutty et al. |

FOREIGN PATENT DOCUMENTS

| | | | |
|---|---|---|---|
| FR | 2 956 160 A1 | 8/2011 |
| JP | 2000-2122 A | 1/2000 |
| JP | 2001-140652 A | 5/2001 |
| JP | 2001-193572 A | 7/2001 |
| JP | 2001-193573 A | 7/2001 |
| JP | 2007-315371 A | 12/2007 |
| JP | 2008-57449 A | 3/2008 |

OTHER PUBLICATIONS

Foreign Office Action of Chinese Patent Application No. 201380066070.0 dated Nov. 2, 2016.

* cited by examiner

CONTROLLING APPARATUS FOR ENGINE

CROSS REFERENCE TO RELATED APPLICATIONS

This application is a Continuation of PCT International Application No. PCT/JP2013/080190, filed on Nov. 8, 2013, which claims priority under 35 U.S.C. 119(a) to Patent Application No. 2012-274850, filed in the Japan on Dec. 17, 2012, all of which are hereby expressly incorporated by reference into the present application.

FIELD

The present invention relates to an engine controlling apparatus including exhaust gas recirculation systems for recirculating exhaust gas to an intake system and a variable geometry turbocharger.

BACKGROUND

Traditional exhaust gas recirculation systems (hereinafter referred to as "EGR systems") recirculate part of the exhaust gas emitted from engines to intake systems in order to improve the exhaust performance. The EGR systems mix the part of the exhaust gas with intake air to decrease the combustion temperature of the mixed air, thereby reducing the emission of nitrogen oxides (NOx). The EGR systems include paths connecting exhaust systems and intake systems of the engines, and valves for adjusting flow rates (hereinafter referred to as "EGR quantities") of exhaust gas in the paths. The openings of the valves are controlled by controllers.

Some engines being practically used are equipped with turbochargers including turbines that are rotated by the energy of exhaust gas and that drive compressors provided coaxially thereto to supercharge compressed air to cylinders, in order to increase the output torque of the engines. In recent years, variable geometry turbochargers have been widespread that include flow-rate adjusting mechanisms called variable vanes in the vicinity of the turbines of the turbochargers. The variable geometry turbocharger is a supercharger of which the supercharging pressure can be controlled through adjusting the opening of the variable vanes and thus controlling the flow rate of exhaust gas onto the turbine. In an engine equipped with such a variable geometry turbocharger, a feedback control of the pressure (hereinafter referred to as "intake manifold pressure") in an intake manifold of the engine is carried out by adjusting the opening of the variable vanes in response to the operating state to keep the intake manifold pressure at a target pressure.

The EGR systems are categorized into two types, i.e., a high-pressure EGR system for recirculating exhaust gas from a position in the exhaust system upstream of the turbine to a position in the intake system downstream of the compressor, and a low-pressure EGR system for recirculating exhaust gas from a position in the exhaust system downstream of the turbine to a position in the intake system upstream of the compressor. An EGR system called "dual-loop EGR system" includes both the high-pressure and low-pressure EGR systems.

CITATION LIST

Patent Literature

PTL 1: Japanese Unexamined Patent Application Publication No. 2007-315371

SUMMARY OF THE INVENTION (1) A controlling apparatus for an engine disclosed herein includes: a variable geometry turbocharger including a turbine disposed in an exhaust path, a compressor disposed in an intake path, and vanes for adjusting the flow rate; a first recirculation system including a first adjuster to adjust the flow rate of exhaust gas in a first path, the first path connecting an upstream position of the turbine to a downstream position of the compressor; and a second recirculation system including a second adjuster to adjust the flow rate of exhaust gas in a second path, the second path connecting a downstream position of the turbine to an upstream position of the compressor.

The controlling apparatus further includes: a recirculation controller to switch between a single use and a combination use by controlling the first adjuster and the second adjuster in response to the operating state of a vehicle, the single use activating one of the first recirculation system and the second recirculation system, the combination use activating both of the first recirculation system and the second recirculation system; and a pressure controller to execute a feedback control of an intake-system pressure in the downstream position of the compressor through adjustment of the opening of the vanes in response to the operating state. The pressure controller prohibits the feedback control and executes a feedforward control of the intake-system pressure during a predetermined period from the switching from the single use to the combination use by the recirculation controller.

DESCRIPTION OF EMBODIMENTS

Embodiments of the invention will now be described with reference to the accompanying drawings. The embodiments are mere illustrative examples and should not be construed to exclude application of various modifications or techniques that are not described in the embodiments.

[1. Configuration of Apparatus]

Figure 1:
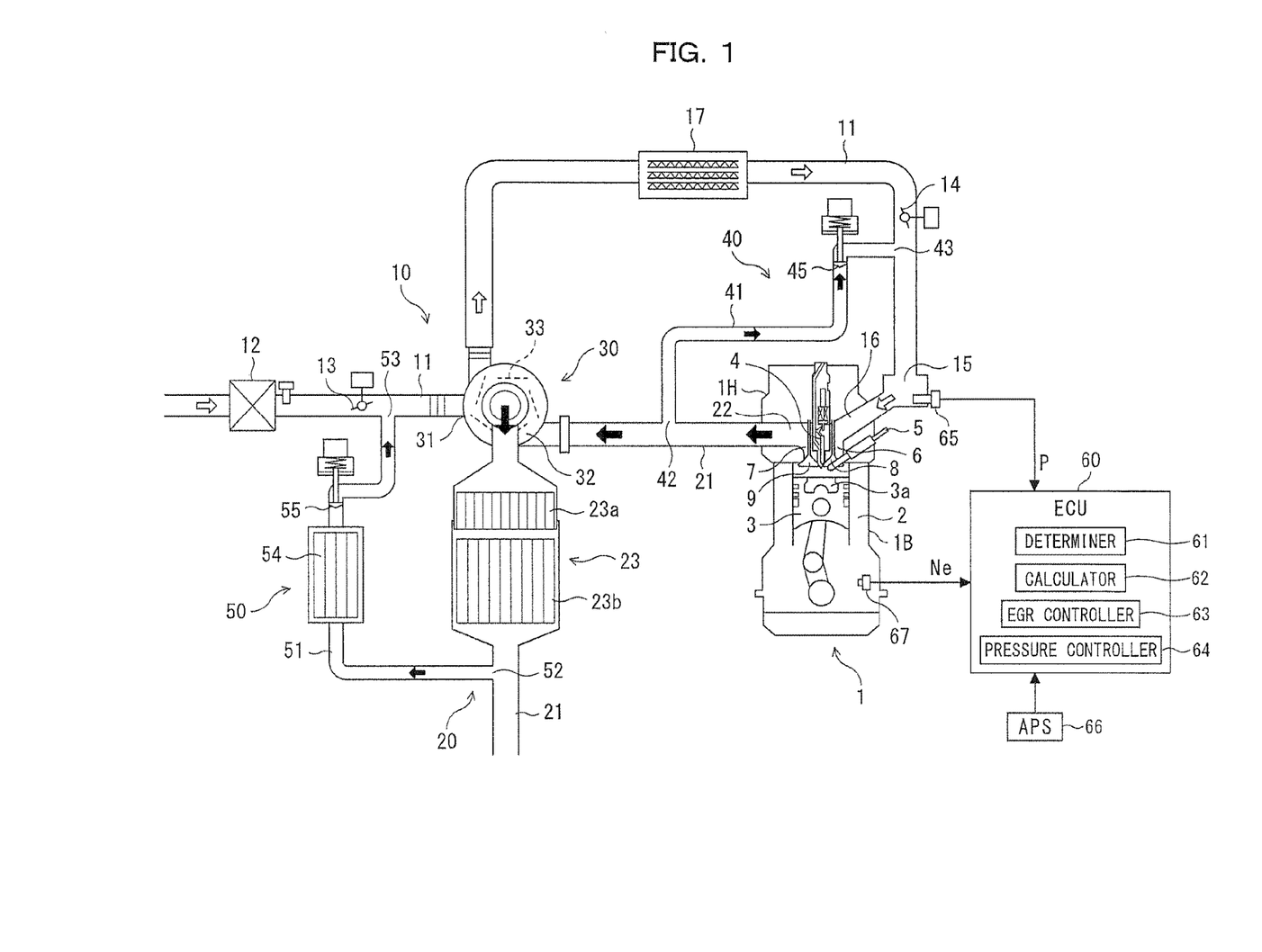
FIG. 1 illustrates the block configuration of an engine controlling apparatus according to an embodiment and the configuration of an engine equipped with the controlling apparatus.

An engine controlling apparatus according to an embodiment is applied to an in-vehicle diesel engine (hereinafter referred to as "engine") 1 illustrated in FIG. 1. The engine 1 is of a multi-cylinder direct-injection type, and FIG. 1 illustrates one of the multiple cylinders. The engine 1 includes multiple cylinders 2 in a cylinder block 18. The cylinders 2 each include a piston 3 vertically reciprocates in the drawing. The pistons 3 are connected to a crankshaft with a connecting rod. The pistons 3 each have a top cavity 3a serving as a combustion chamber. The multiple cylinders 2 having the same configuration are disposed perpendicular to the drawing plane in FIG. 1.

The cylinders 2 each have a cylinder head 1H equipped with an injector 4 and a glow plug 5. The nozzle of the injector 4 protrudes to the internal space of the cylinder 2 to directly inject fuel into the cylinder 2. The injector 4 is oriented to inject fuel toward the cavity 3a of the piston 3. The injector 4 is connected to a fuel pipe at the base end, to be supplied with pressurized fuel through the fuel pipe. The glow plug 5 is controlled to improve the combustion in the engine 1 in a cold operation.

The cylinder head 1H is provided with an intake port 6 and an exhaust port 7 in communication with the internal space of the cylinder 2, and an intake valve 8 and an exhaust valve 9 to open or close the respective ports 6 and 7. The intake port 6 leads to an intake system 10 upstream thereof via an intake manifold 16. The intake system 10 includes an intake path 11 equipped with various components. The exhaust port 7 leads to an exhaust system 20 downstream thereof via an exhaust manifold 22. The exhaust system 20 includes an exhaust path 21 equipped with various components.

The intake manifold 16 includes a surge tank 15 for temporarily reserving air flowing toward the intake port 6. A section of the intake manifold 16 downstream of the surge tank 15 diverges toward the respective intake ports 6 of the cylinders 2 at the surge tank 15, which is disposed at the branch. The surge tank 15 can reduce possible pulsation and interference of intake air in the cylinders 2. The exhaust manifold 22 leads to the respective exhaust ports 7 of the cylinders 2 at the upstream diverging ends, and to the exhaust path 21 at the downstream converging end.

The engine 1 is equipped with a turbocharger 30, a high-pressure EGR loop (first recirculation system) 40, and a low-pressure EGR loop (second recirculation system) 50 in the intake and exhaust systems 10 and 20.

The turbocharger 30 is a variable geometry turbocharger (hereinafter referred to as "VG turbocharger 30") including a compressor 31 disposed in the intake path 11, a turbine 32 disposed in the exhaust path 21, and multiple variable vanes 33 disposed around the turbine 32. In the VG turbocharger 30, the turbine 32 is rotated by the energy of exhaust gas and drives the compressor 31 provided coaxially to the turbine 32 to compress air and supply the compressed air to the cylinders 2. The supercharging pressure can be controlled through the adjustment of the degree of opening (hereinafter referred to as "vane opening") of the variable vanes 33. The vane opening is controlled by an ECU 60 (described below).

The high-pressure EGR loop 40 and the low-pressure EGR loop 50 are each an exhaust gas recirculation system for recirculating the exhaust gas emitted from the cylinders 2 of the engine 1 to the intake system. In other words, the engine 1 is equipped with two exhaust gas recirculation systems (i.e., a dual-loop EGR system). The high-pressure EGR loop 40 and the low-pressure EGR loop 50 are hereinafter collectively referred to as "EGR systems."

The high-pressure EGR loop 40 includes a high-pressure EGR path (first path) 41 connecting a portion of the exhaust path 21 upstream of the turbine 32 of the VG turbocharger 30 to a portion of the intake path 11 downstream of the compressor 31 of the VG turbocharger 30. The high-pressure EGR path 41 is provided with a high-pressure EGR valve (first adjuster) 45 in an intermediate position. The high-pressure EGR path 41 may lead to the exhaust manifold 22 instead of the exhaust path 21, and may lead to the surge tank 15 instead of the intake path 11.

The low-pressure EGR loop 50 includes a low-pressure EGR path (second path) 51 connecting a portion of the exhaust path 21 downstream of the turbine 32 to a portion of the intake path 11 upstream of the compressor 31. The low-pressure EGR path 51 is provided with an EGR cooler 54 and a low-pressure EGR valve (second adjuster) 55 in an intermediate position.

In the intake system 10 of the engine 1, the intake path 11 is equipped with an air cleaner 12, a low-pressure throttle valve (second adjuster) 13, an outlet 53 of the low-pressure EGR path 51, the compressor 31 of the VG turbocharger 30, an intercooler 17, a high-pressure throttle valve (first adjuster) 14, and an outlet 43 of the high-pressure EGR path 41, in sequence from the upstream side.

The low-pressure throttle valve 13 functions as an intake-air throttle valve that adjusts the flow rate of air in the intake path 11 on the basis of the opening thereof and also functions as an EGR quantity adjuster that adjusts the flow rate (hereinafter referred to as "low-pressure EGR quantity") of exhaust gas in the low-pressure EGR path 51 on the basis of the opening thereof. In specific, if the low-pressure EGR valve 55 is fully closed, the flow rate of air through a portion of the intake path 11 including the low-pressure throttle valve 13 varies depending on the opening of the low-pressure throttle valve 13. If the low-pressure EGR valve 55 is not fully closed, the low-pressure EGR quantity varies depending on the openings of the low-pressure EGR valve 55 and the low-pressure throttle valve 13. The openings of the low-pressure EGR valve 55 and the low-pressure throttle valve 13 are individually controlled by the ECU 60.

The high-pressure throttle valve 14 functions as an intake-air throttle valve that adjusts the flow rate of air toward the intake manifold 16 on the basis of the opening thereof and also functions as an EGR quantity adjuster that adjusts the flow rate (hereinafter referred to as "high-pressure EGR quantity") of exhaust gas in the high-pressure EGR path 41 on the basis of the opening thereof. In specific, if the high-pressure EGR valve 45 is fully closed, the flow rate of air toward the intake manifold 16 varies depending on the opening thereof. If the high-pressure EGR valve 45 is not fully closed, the high-pressure EGR quantity varies depending on the openings of the high-pressure EGR valve 45 and the high-pressure throttle valve 14. The openings of the high-pressure EGR valve 45 and the high-pressure throttle valve 14 are individually controlled by the ECU 60.

In the exhaust system 20, the exhaust path 21 is equipped with an inlet 42 of the high-pressure EGR path 41, the turbine 32 of the VG turbocharger 30, a catalyst unit 23, and an inlet 52 of the low-pressure EGR path 51, in sequence from the upstream side. The catalyst unit 23 includes an oxidation catalyst 23a and a diesel particulate filter 23b in sequence from the upstream side. The exhaust path 21 may be further equipped with another catalyst unit, which includes a NOx trapping catalyst, for example, downstream of the inlet 52.

The surge tank 15 is provided with a pressure sensor 65 to detect the actual intake manifold pressure P (the pressure in the intake manifold 16 corresponding to the pressure in the surge tank 15). The detected actual intake manifold pressure P (intake-system pressure) is transmitted to the ECU 60.

The vehicle is provided with an accelerator position sensor (APS) 66 to detect a pressing depth on an accelerator pedal (accelerator position A). The accelerator position A is a parameter representing a driver's request for acceleration or start. In other words, the accelerator position A is correlated with the load on the engine 1 (required output for the engine 1). The accelerator position A detected with the accelerator position sensor 66 is transmitted to the ECU 60.

The crankshaft is provided with an engine speed sensor 67 to detect the angle $\theta$ of rotation of the crankshaft. The rate of change in the angle $\theta$ of rotation per unit time (angular velocity $\omega$) is proportional to the actual rotation number Ne (per unit time) of the engine 1. The engine speed sensor 67 thus can acquire the actual rotation number Ne of the engine 1. The acquired actual rotation number Ne is transmitted to the ECU 60. Alternatively, the actual rotation number Ne may be calculated by the ECU 60 on the basis of the angle $\theta$ of rotation detected with the engine speed sensor 67.

The vehicle is equipped with the electronic control unit (ECU) 60 to control the engine 1. The ECU 60 is a computer including a CPU for various calculations, a ROM for storing programs and data required for the control, a RAM for temporarily storing the results of the calculation in the CPU, and input and output ports for exchanging signals with external devices. The input of the ECU 60 is connected to the pressure sensor 65, the accelerator position sensor 66, and the engine speed sensor 67. The output of the ECU 60 is connected to the variable vanes 33, the low-pressure throttle valve 13, the high-pressure throttle valve 14, the high-pressure EGR valve 45, and the low-pressure EGR valve 55.

[2. Configuration of Control]
[2-1. Description of Control]

The ECU 60 controls the total EGR quantity, i.e., the sum of the high-pressure EGR quantity and the low-pressure EGR quantity, in response to the operating state (EGR control); and controls the actual intake manifold pressure P through the adjustment of the vane opening (intake manifold pressure control).

The EGR control recirculates part of the exhaust gas to the intake system through one or both of the high-pressure EGR loop 40 and the low-pressure EGR loop 50. This control decreases the combustion temperature of mixed air and thus reduces nitrogen oxides (NOx) contained in the exhaust gas. In this embodiment, the EGR control is switched among three usage states in response to the operating state, i.e., a high-pressure single use activating the high-pressure EGR loop 40 alone, a low-pressure single use activating the low-pressure EGR loop 50 alone, and a combination use activating both the high-pressure EGR loop 40 and the low-pressure EGR loop 50.

The intake manifold pressure control is categorized into two types, i.e., a feedback control for adjusting the actual intake manifold pressure P to a target intake manifold pressure (target pressure) $P_{TGT}$ determined in response to the operating state, and a feedforward control for adjusting the vane opening to a predetermined degree of opening (hereinafter referred to as "target vane opening"). The feedback control of the intake manifold pressure is intended to reduce a variation in the actual intake manifold pressure P caused by individual differences in VG turbochargers 30. The feedforward control of the intake manifold pressure of the intake manifold pressure is executed in place of the feedback control upon the satisfaction of a predetermined condition.

[2-2. Control Block Configuration]

The ECU 60 includes a determiner 61, a calculator 62, an EGR controller 63, and a pressure controller 64, as functional elements for the EGR control and the intake manifold pressure control. These elements may be electronic circuits (hardware), or may be incorporated into a program (software). Alternatively, some of the functions of the elements may be provided in the form of hardware while the other may be provided in the form of software.

The determiner 61 makes determination on the EGR control and determination on the intake manifold pressure control. The determination on the EGR control will now be explained. The determiner 61 determines the usage state of the EGR systems in response to the operating state of the vehicle. In specific, the determiner 61 determines whether the high-pressure EGR loop 40 and the low-pressure EGR loop 50 are activated alone (the high-pressure single use or the low-pressure single use) or in parallel (the combination use). This determination is based on the map of FIG. 2, for example.

Figure 2:
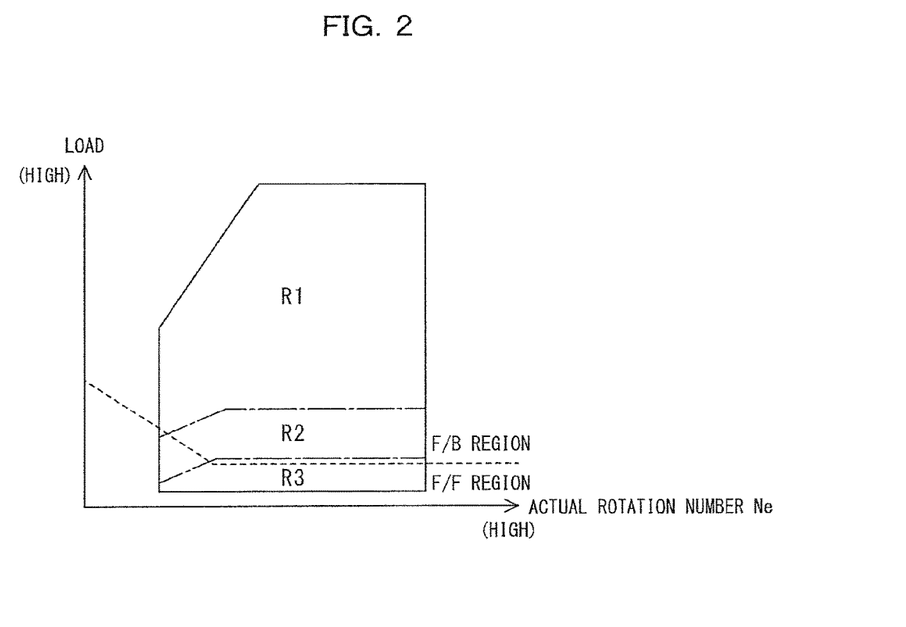
FIG. 2 is a map illustrating EGR usage regions and regions of an intake manifold pressure control.

FIG. 2 is a map that defines three regions R1, R2, and R3 of the usage state of the EGR systems in response to the actual rotation number Ne of the engine 1 and the load on the engine 1. The map is preliminarily stored in the ECU 60. The region R1 indicates the low-pressure single region activating the low-pressure EGR loop 50 alone, the region R2 indicates the combination region activating both the low-pressure EGR loop 50 and the high-pressure EGR loop 40, and the region R3 indicates the high-pressure single region activating the high-pressure EGR loop 40 alone. The determiner 61 acquires information on the actual rotation number Ne and the load from the engine speed sensor 67 and the accelerator position sensor 66, respectively, and applies the information to the map of FIG. 2, to determine whether the current operating state of the vehicle corresponds to region R1, R2, or R3. If the current operating state does not correspond to any regions R1, R2, and R3, the determiner 61 determines not to activate the EGR systems.

In supplementary description on the map of FIG. 2, since NOx contained in exhaust gas decreases as the temperature of intake air in the intake manifold 16 is lower, the low-pressure EGR loop 50 emitting relatively cool exhaust gas is more advantageous to the reduction in the emission of NOx. Unfortunately, a significantly low temperature of intake air in a low-load operation readily destabilizes the combustion, resulting in another problem of an increase in the emission of unburned materials such as hydrocarbon (HC). Accordingly, the high-pressure EGR loop 40 emitting relatively hot exhaust gas is more advantageous to the low-load operation in terms of the combustion stability and the reduction in the emission of unburned materials. The map of FIG. 2 is determined in view of improvements in the exhaust performance and the combustion stability. It is noted that the three regions R1, R2, and R3 illustrated in the map of FIG. 2 are given for illustration, and the forms of the respective regions may be appropriately modified based on the performance of the engine 1 or the catalyst unit 23.

The determiner 61 further determines whether to switch the usage state of the EGR systems in response to variations in the actual rotation number Ne and the load, and then determines whether the usage state after the switching is the combination use. In other words, the determiner 61 determines whether the EGR systems have been switched from the low-pressure single region R1 or the high-pressure single region R3 to the combination region R2 in the map of FIG. 2. The results of the determination are transmitted to the EGR controller 63 and the pressure controller 64.

The determination on the intake manifold pressure control will now be explained. The determiner 61 determines whether to execute the feedback control or the feedforward control of the actual intake manifold pressure P in response to the operating state of the vehicle. This determination is also based on the map of FIG. 2 in the embodiment. The map of FIG. 2 defines an F/B region involving the feedback control of the intake manifold pressure and an F/F region involving the feedforward control of the intake manifold pressure in response to the actual rotation number Ne of the engine 1 and the load on the engine 1, in addition to the regions R1, R2, and R3. The determiner 61 acquires information on the actual rotation number Ne and the load from the engine speed sensor 67 and the accelerator position sensor 66, respectively, and applies the information to the map of FIG. 2, to determine whether the current operating state of the vehicle corresponds to region is the F/B region or the F/F region.

With reference to FIG. 2, the feedback control of the intake manifold pressure is executed except for the time when the low-load operation, because the actual intake manifold pressure P has little effect on the exhaust performance and the actual intake manifold pressure P is poorly responsive to a variation in the vane opening in the low-load operation. In other words, the feedforward control of the intake manifold pressure for adjusting the vane opening to a predetermined opening is executed instead of the feedback control in the low-load operation.

The regions illustrated in the map of FIG. 2 are given for illustration and should not be construed to limit the invention. For example, the boundary between the F/B region and the F/F region is defined in a lower-load region than the boundary between the combination region R2 and the high-pressure single region R3 in the map of FIG. 2. Alternatively, the boundary between the F/B region and the F/F region may be defined in view of the effects on exhaust gas or the controllability of the actual intake manifold pressure P. Although the three regions R1, R2, and R3 of the EGR control and the F/B and F/F regions of the intake manifold pressure control are both defined in the map of FIG. 2, they may be defined in different maps. The results of the determination are transmitted to the pressure controller 64.

The calculator 62 executes calculation for the EGR control and calculation for the intake manifold pressure control. The calculation for the EGR control will now be explained. The calculator 62 calculates a target quantity (total target EGR quantity) of the total EGR quantity, i.e., the sum of the low-pressure EGR quantity and the high-pressure EGR quantity, in response to the operating state of the vehicle. The ECU 60 preliminarily stores a map or formula that defines the total target EGR quantity varying depending on the load for each actual rotation number Ne, for example. The calculator 62 calculates the total target EGR quantity on the basis of the map or formula. The total target EGR quantity may also be calculated by any other procedure, for example, based on a target oxygen level in the intake manifold, which is acquired from the actual rotation number Ne or the load on the basis of a map or formula. The results of the calculation are transmitted to the EGR controller 63.

The calculation for the intake manifold pressure control will now be explained. The calculator 62 calculates the target pressure (target intake manifold pressure) $P_{TGT}$ of the actual intake manifold pressure P in response to the operating state of the vehicle. The ECU 60 preliminarily stores a map or formula that defines the target intake manifold pressure $P_{TGT}$ increasing with an increase in the load for each actual rotation number Ne, for example. The calculator 62 calculates the target intake manifold pressure $P_{TGT}$ on the basis of the map or formula. The target intake manifold pressure $P_{TGT}$ may also be calculated by any other well-known procedure. The results of the calculation are transmitted to the pressure controller 64.

The EGR controller (recirculation controller) 63 executes the EGR control through the adjustment of the openings of the low-pressure throttle valve 13, the low-pressure EGR valve 55, the high-pressure throttle valve 14, and the high-pressure EGR valve 45, on the basis of the results of the determination from the determiner 61 and the results of the calculation from the calculator 62. The low-pressure EGR quantity is finely adjusted by the opening of the low-pressure throttle valve 13, whereas the high-pressure EGR quantity is finely adjusted by the opening of the high-pressure throttle valve 14 or the high-pressure EGR valve 45. The low-pressure throttle valve 13, the low-pressure EGR valve 55, the high-pressure throttle valve 14, and the high-pressure EGR valve 45, of which the openings are adjusted by the EGR controller 63, are hereinafter collectively referred to as "EGR actuators."

If the determiner 61 determines that the current operating state of the vehicle corresponds to the low-pressure single region R1, the EGR controller 63 sets the opening of the high-pressure throttle valve 14 to be fully open and the opening of the high-pressure EGR valve 45 to be fully closed. The high-pressure EGR quantity thus falls to zero. The EGR controller 63 also sets the opening of the low-pressure EGR valve 55 to be fully open, and executes a feedback control of the opening of the low-pressure throttle valve 13 on the basis of the total target EGR quantity calculated by the calculator 62. In other words, the EGR controller 63 estimates the low-pressure EGR quantity from the actual rotation number Ne, the load, and the opening of the low-pressure throttle valve 13, and then adjusts the opening of the low-pressure throttle valve 13 such that the estimated low-pressure EGR quantity equals the total target EGR quantity, in the low-pressure EGR loop 50. It is noted that the low-pressure EGR quantity increases with a decrease in the opening of the low-pressure throttle valve 13, and decreases with an increase in the opening.

If the determiner 61 determines that the current operating state corresponds to the high-pressure single region R3, the EGR controller 63 sets the opening of the low-pressure throttle valve 13 to be fully open and the opening of the low-pressure EGR valve 55 to be fully closed. The low-pressure EGR quantity thus falls to zero. The EGR controller 63 also sets the opening of the high-pressure EGR valve 45 to be fully open and adjusts the opening of the high-pressure throttle valve 14 to a predetermined opening. The predetermined opening is determined based on the total target EGR quantity calculated by the calculator 62. It is noted that the total target EGR quantity indicates the target value of the high-pressure EGR quantity in this case.

For example, the predetermined opening is determined based on a map or formula preliminarily stored in the ECU 60, which defines the predetermined opening varying depending on the actual rotation number Ne and the load. In other words, in the high-pressure single region R3, the EGR controller 63 executes a feedforward control that adjusts the opening of the high-pressure throttle valve 14 to the predetermined opening. It is noted that the high-pressure EGR quantity increases with a decrease in the opening of the high-pressure throttle valve 14, and decreases with an increase in the opening.

If the determiner 61 determines that the current operating state corresponds to the combination region R2, the EGR controller 63 sets the opening of the low-pressure EGR valve 55 to be fully open, and executes the feedback control of the opening of the low-pressure throttle valve 13 on the basis of the total target EGR quantity calculated by the calculator 62 as in the low-pressure single region R1, in the low-pressure EGR loop 50. The EGR controller 63 also sets the opening of the high-pressure throttle valve 14 to be fully open and adjusts the opening of the high-pressure EGR valve 45 to a predetermined opening, in the high-pressure EGR loop 40. The predetermined opening, which corresponds to the residual EGR quantity after the subtraction of the low-pressure EGR quantity from the total target EGR quantity (i.e., the target value of the high-pressure EGR quantity), is determined based on a map or formula, as in the high-pressure single region R3. Although the feedforward control is targeted to different valves between the high-pressure single region R3 and the combination region R2 in the high-pressure EGR loop 40 in the embodiment, the control may also be targeted to the same valve over these usage states.

In other words, in the combination region R2, the EGR controller 63 controls the openings of the low-pressure EGR valve 55 and the high-pressure throttle valve 14 to be fully open, executes the feedforward control of the opening of the high-pressure EGR valve 45, and executes the feedback control of the opening of the low-pressure throttle valve 13. This control can achieve the total target EGR quantity.

In the high-pressure single region R3 and the combination region R2, the high-pressure EGR loop 40 is under the feedforward control, because a feedback control over the high-pressure EGR loop 40 takes time to achieve the target quantity (total target EGR quantity) due to the interaction of the feedback control with the intake manifold pressure control by the vane openings (explained below). In other words, the feedforward control is selected to rapidly achieve the target value of the high-pressure EGR quantity. Alternatively, the high-pressure EGR loop 40 may be under the feedback control, likewise the low-pressure EGR loop 50.

In response to the results of the determination that the usage state of the EGR systems needs switching from the determiner 61, the EGR controller 63 rapidly adjusts the openings of the respective EGR actuators on the basis of the usage state after the switching, to switch the EGR systems. After the switching of the EGR systems, the EGR controller 63 informs the pressure controller 64 of the switching of the usage state of the EGR systems.

The control on the EGR actuators by the EGR controller 63 in the low-pressure single region R1, the combination region R2, and the high-pressure single region R3 is summarized in the following Table 1:

TABLE 1

| | LOW-PRESSURE THROTTLE VALVE | LOW-PRESSURE EGR VALVE | HIGH-PRESSURE THROTTLE VALVE | HIGH-PRESSURE EGR VALVE |
|---|---|---|---|---|
| LOW-PRESSURE SINGLE USE | FEEDBACK CONTROL | FULLY OPEN | FULLY OPEN | FULLY CLOSED |
| COMBINATION USE | FEEDBACK CONTROL | FULLY OPEN | FULLY OPEN | FEED-FORWARD CONTROL |
| HIGH-PRESSURE SINGLE USE | FULLY OPEN | FULLY CLOSED | FEED-FORWARD CONTROL | FULLY OPEN |

The pressure controller 64 executes the intake manifold pressure control through the adjustment of the opening of the variable vanes 33 of the VG turbocharger 30 on the basis of the results of the determination from the determiner 61, the results of the calculation from the calculator 62, and the information from the EGR controller 63.

If the determiner 61 determines that the current operating state corresponds to the F/F region, the pressure controller 64 executes the feedforward control of the intake manifold pressure. In specific, the pressure controller 64 acquires the target vane opening corresponding to the target intake manifold pressure $P_{TGT}$ calculated by the calculator 62, and then adjusts the vane opening to the target vane opening. The pressure controller 64 acquires the target vane opening from a map or formula preliminarily stored in the ECU 60, which defines the correspondence between the target intake manifold pressure $P_{TGT}$ and the vane opening.

If the determiner 61 determines that the current operating state corresponds to the F/B region, the pressure controller 64 executes the feedback control of the intake manifold pressure except for a specific case. The feedback control of the intake manifold pressure indicates here that the vane opening is adjusted such that the actual intake manifold pressure P detected with the pressure sensor 65 equals the target intake manifold pressure $P_{TGT}$ calculated by the calculator 62. Since the determination of the current operating state to correspond to the F/B region by the determiner 61 indicates the necessity of the feedback control of the intake manifold pressure, the pressure controller 64 executes the feedback control of the intake manifold pressure in principle.

It is noted that the pressure controller 64 prohibits the feedback control of the intake manifold pressure and executes the feedforward control of the intake manifold pressure in the specific case, where the EGR control and the feedback control of the intake manifold pressure readily interfere with each other. The interference between the two controls indicates here a state where, while the feedback control of the intake manifold pressure by the pressure controller 64 and the control on the EGR actuators by the EGR controller 63 are being executed, the actual intake manifold pressure P reaches the target intake manifold pressure $P_{TGT}$ and the total EGR quantity also reaches the total target EGR quantity, even when the vane opening is not controlled to the intended opening. In other words, the interference means the two controls that have achieved the respective goals even if the two controls are both in unstable sates, failing to achieve an intended state.

Such interference between the two controls can occur upon the switching of the EGR systems from the single use to the combination use during the feedback control of the intake manifold pressure. The switching of the EGR systems is originally caused by a variation in the load on the engine 1 or the actual rotation number Ne of the engine 1. Such a variation also changes the target intake manifold pressure PTCI and thus requires the adjustment of the vane opening. In other words, the EGR actuators and the variable vanes 33 are both individually controlled upon the switching of the EGR systems.

The high-pressure EGR loop 40 in the EGR systems, which is disposed downstream of the compressor 31 and upstream of the turbine 32, affects the actual intake manifold pressure P. In specific, an increase in the high-pressure EGR quantity leads to decreases in the rotational speed of the turbine 32, then the supercharging pressure, and thus the actual intake manifold pressure P. In contrast, a decrease in the high-pressure EGR quantity leads to increases in the rotational speed of the turbine 32, then the supercharging pressure, and thus the actual intake manifold pressure P. In other words, the actual intake manifold pressure P varies depending on both the vane opening and the high-pressure EGR quantity. If the EGR systems are switched from the low-pressure single use or high-pressure single use to the combination use, the high-pressure EGR quantity varies and thus unintentionally changes the actual intake manifold pressure P. Thus, the feedback control of the intake manifold pressure by the vane opening may provide unintended results.

In order to solve this problem, the pressure controller 64 prohibits the feedback control of the intake manifold pressure in the specific case, i.e., during a predetermined period from the switching of the EGR systems from the low-pressure single use or high-pressure single use to the combination use. The pressure controller 64 executes the feedforward control of the intake manifold pressure in place of the feedback control. In specific, the feedback control of the intake manifold pressure is prohibited from the determination of the switching from the low-pressure single region R1 or the high-pressure single region R3 to the combination region R2 by the determiner 61 until the satisfaction of a predetermined condition (i.e., during the predetermined period). It is noted that the beginning of the predetermined period indicates the moment when the EGR systems are switched from the low-pressure single use or high-pressure single use to the combination use. The pressure controller 64 returns to the feedback control of the intake manifold pressure after the lapse of the predetermined period.

The predetermined condition indicates the absolute value of the difference between the actual intake manifold pressure P and the target intake manifold pressure $P_{TGT}$ equal to or smaller than a predetermined value $P_0$ ($|P_{TGT}-P| \leq P_0$). The predetermined value $P_0$ is equal to or larger than zero. The following explanation assumes the predetermined value $P_0$ to be zero. In other words, the pressure controller 64 prohibits the feedback control of the intake manifold pressure until the actual intake manifold pressure P reaches the target intake manifold pressure $P_{TGT}$, and restarts the feedback control when the actual intake manifold pressure P reaches the target intake manifold pressure $P_{TGT}$.

[3. Flowchart]

Example procedures of the EGR control and the intake manifold pressure control in the ECU 60 will now be explained with reference to FIG. 3. This process is repeated in a predetermined cycle.

Figure 3:
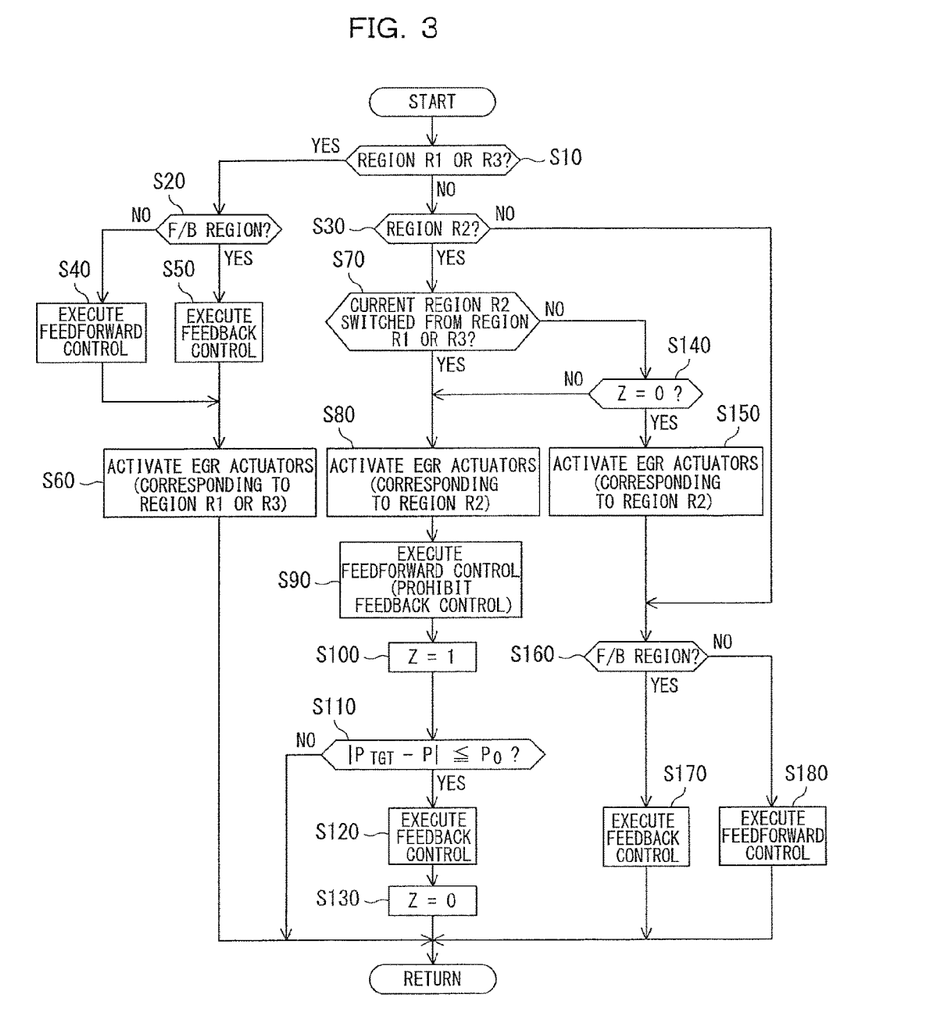
FIG. 3 is a flowchart illustrating an example control procedure in the controlling apparatus illustrated in FIG. 1.

With reference to FIG. 3, in Step S10, the determiner 61 determines whether the usage region of the EGR systems is in the low-pressure single region R1 or the high-pressure single region R3. If the usage region of the EGR systems is in the low-pressure single region R1 or the high-pressure single region R3, the process goes to Step S20. Otherwise the process goes to Step S30.

In Step S20, the determiner 61 determines whether the current region is the F/B region involving the feedback control of the intake manifold pressure. If the current region is not the F/B region, the process goes to Step S40. In Step S40, the calculator 62 calculates the target intake manifold pressure $P_{TGT}$, and the pressure controller 64 executes the feedforward control of the intake manifold pressure through the adjustment of the vane opening to the predetermined opening. The process then goes to Step S60.

If the current region is the F/B region, the process goes to Step S50. In Step S50, the calculator 62 calculates the target intake manifold pressure $P_{TGT}$, and the pressure controller 64 executes the feedback control of the intake manifold pressure through the adjustment of the vane opening. The process then goes to Step S60. In Step S60, the EGR controller 63 executes the EGR control through the activation of the EGR actuators corresponding to the usage region R1 or R3 of the EGR systems. The process then returns.

In Step S30, the determiner 61 determines whether the usage region of the EGR systems is in the combination region R2. If the usage region is in the combination region R2, the process goes to Step S70. In Step S70, the determiner 61 determines whether the current usage region R2 of the EGR systems is switched from the region R1 or R3. If the region R2 is not switched from the region R1 or R3 (i.e., the EGR systems have been in the combination use), the process goes to Step S140.

If the current usage region R2 of the EGR systems is switched from the region R1 or R3 (i.e., the EGR systems are switched from the single use to the combination use) in Step S70, the process goes to Step S80. In Step S80, the EGR controller 63 controls the EGR actuators corresponding to the region R2. In other words, a YES determination in Step S70 indicates the beginning of the "period of prohibiting the feedback control of the intake manifold pressure." In ensuing Step S90, the pressure controller 64 prohibits the feedback control of the intake manifold pressure and executes the feedforward control of the intake manifold pressure.

In specific, the calculator 62 calculates the target intake manifold pressure $P_{TGT}$, and the pressure controller 64 executes the feedforward control of the intake manifold pressure through the adjustment of the vane opening to the predetermined opening, in Step S90. In Step S100, a flag Z is set to 1, and the process goes to Step S110. The flag Z is a variable indicating the availability of the feedback control of the intake manifold pressure, where Z=0 indicates that the feedback control of the intake manifold pressure is available (not prohibited) while Z=1 indicates that the feedback control is prohibited.

In Step S110, the pressure controller 64 determines whether the absolute value of the difference between the actual intake manifold pressure P and the target intake manifold pressure $P_{TGT}$ is equal to or smaller than the predetermined value $P_0$ ($|P_{TGT}-P| \leq P_0$). In other words, the pressure controller 64 determines the end of the period of prohibiting the feedback control of the intake manifold pressure. If the absolute value of the difference between the actual intake manifold pressure P and the target intake manifold pressure $P_{TGT}$ is larger than the predetermined value $P_0$, the process returns. In this case, since the usage region of the EGR systems is in the region R2, the process goes through Steps S10 and S30 to Step S70, it is determined that the current region R2 is not switched from the region R1 or R3, and then the process goes to Step S140 through the NO route of Step S70.

In Step S140, whether the flag Z is 0 is determined. Since the flag Z was set to 1 in Step S100 in the previous cycle in this case, the process goes to Step S80. In other words, the processes in Steps S10, S30, S70, S140, and S80 to S110 are repeated until a Yes determination in Step S110. It is noted that the period of repeating the processes corresponds to the "predetermined period."

If the absolute value of the difference between the actual intake manifold pressure P and the target intake manifold pressure $P_{TGT}$ is equal to or smaller than the predetermined value $P_0$ in Step S110, which indicates the end of the period of prohibiting the feedback control of the intake manifold pressure, the process goes to Step S120, and the feedback control of the intake manifold pressure is restarted. In Step S130, the flag Z is reset to 0, and the process returns.

If the usage region of the EGR systems is in the region R2 and if the flag Z is 0, the process goes through Steps S10, S30, S70, and S140, to Step S150. In Step S160, the determiner 61 determines whether the current region is the F/B region involving the feedback control of the intake manifold pressure. If the current region is the F/B region, the process goes to Step S170. Otherwise the process goes to Step S180.

In Step S170, the calculator 62 calculates the target intake manifold pressure $P_{TGT}$, and the pressure controller 64 executes the feedback control of the intake manifold pressure through the adjustment of the vane opening. The process then returns. In Step S180, the calculator 62 calculates the target intake manifold pressure $P_{TGT}$, and the pressure controller 64 executes the feedforward control of the intake manifold pressure through the adjustment of the vane opening to the predetermined opening. The process then returns.

If the usage region of the EGR systems is in none of the regions R1, R2, and R3 in Step S30, the process goes to Step S160, and whether to execute the feedback control of the intake manifold pressure is determined. The pressure controller 64 then controls the intake manifold pressure on the basis of the results of the determination.

[4. Operations]

Figure 4:
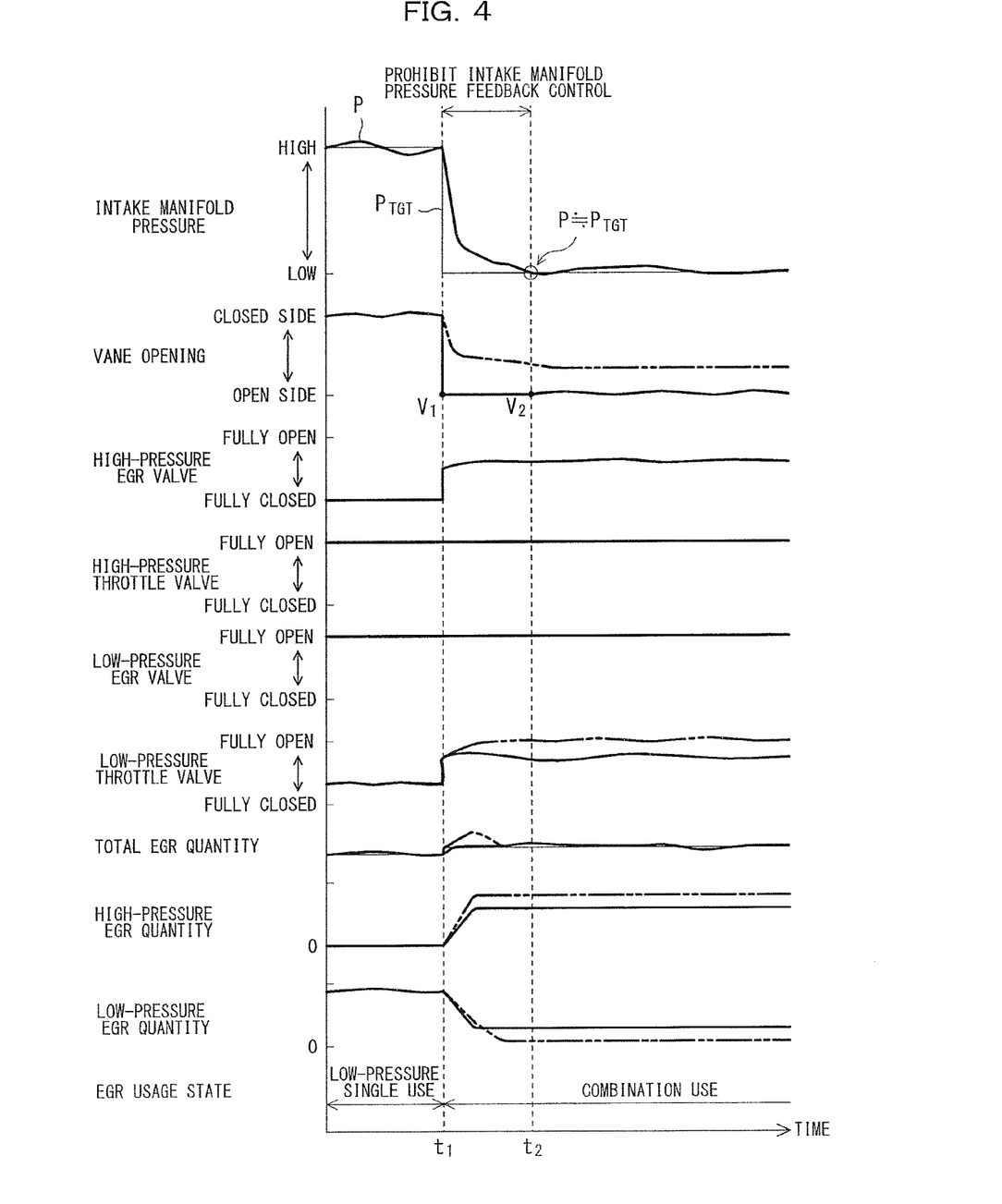
FIG. 4 is a time chart illustrating control operations of the controlling apparatus illustrated in FIG. 1 in the switching of EGR systems from a low-pressure single use to a combination use.
Figure 5:
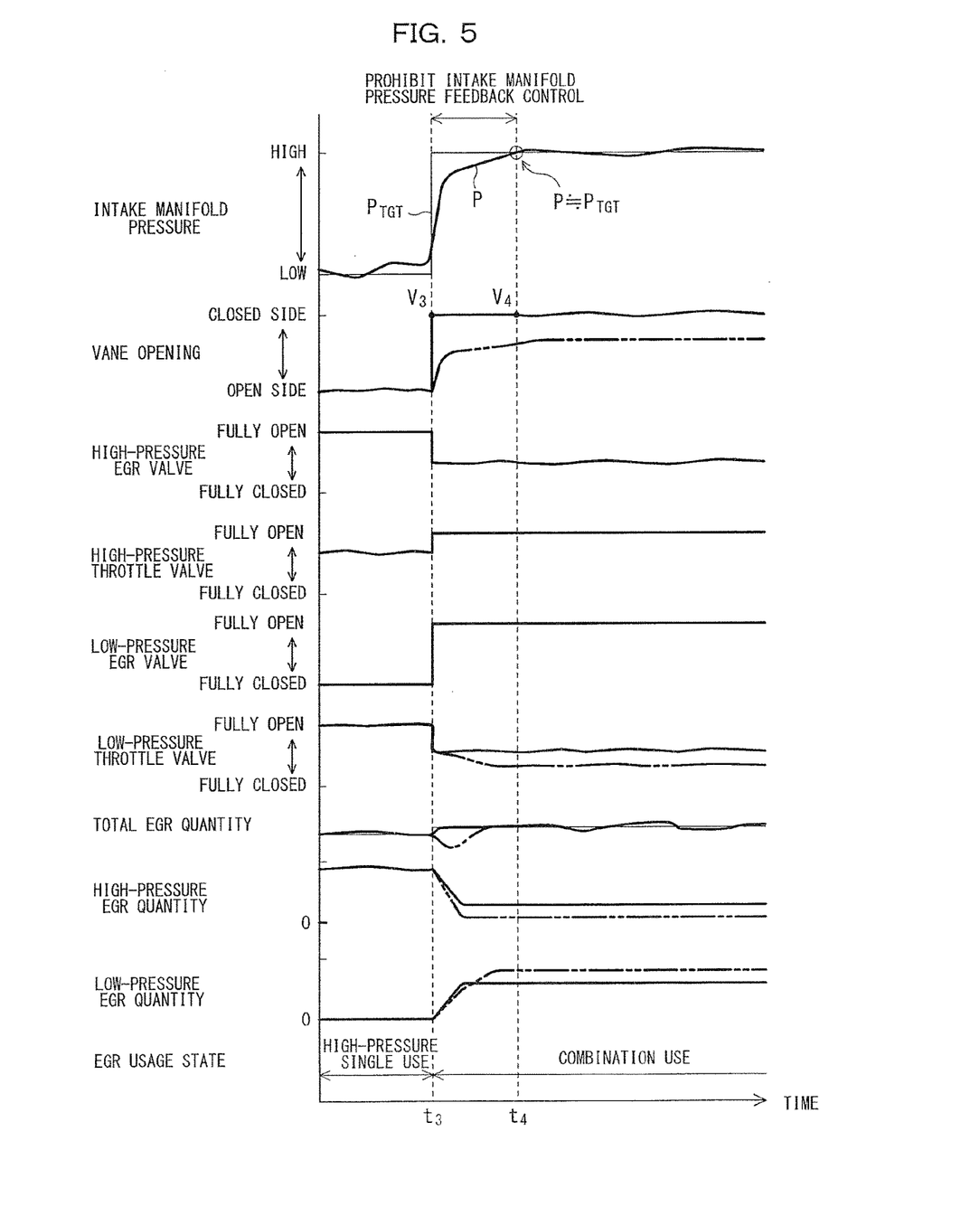
FIG. 5 is a time chart illustrating control operations of the controlling apparatus illustrated in FIG. 1 in the switching of EGR systems from a high-pressure single use to a combination use.

The operations in the parallel execution of the EGR control and the feedback control of the intake manifold pressure by the controlling apparatus will now be explained with reference to FIGS. 4 and 5. FIG. 4 is a time chart in the switching of the EGR systems from the low-pressure single use to the combination use. FIG. 5 is a time chart in the switching of the EGR systems from the high-pressure single use to the combination use. In FIGS. 4 and 5, thin solid lines each indicate a target value, thick solid lines each indicate the content or results of control in the present controlling apparatus, and two-dot chain lines each indicate the results of control in a traditional controlling apparatus. The lines overlapping with a thick solid line are replaced with the thick solid line alone.

The switching of the EGR systems from the low-pressure single use to the combination use during the feedback control of the intake manifold pressure will now be explained. With reference to FIG. 4, in the low-pressure single use until a time $t_1$, the high-pressure EGR valve 45 is fully closed whereas the high-pressure throttle valve 14 is fully open, resulting in a zero high-pressure EGR quantity. The low-pressure EGR valve 55 is fully open, and the opening of the low-pressure throttle valve 13 is under the feedback control such that the total EGR quantity (i.e., the low-pressure EGR quantity) equals the total target EGR quantity. In addition, the pressure controller 64 executes the feedback control of the intake manifold pressure through adjusting the vane opening such that the actual intake manifold pressure P equals the target intake manifold pressure $P_{TGT}$ in the low-pressure single use until the time $t_1$.

At the switching time $t_1$ of the EGR systems from the low-pressure single use to the combination use in response to a variation in the load on the engine 1 or the actual rotation number Ne of the engine 1, the high-pressure EGR valve 45 is opened to the predetermined opening to increase the high-pressure EGR quantity, whereas the opening of the low-pressure throttle valve 13 is increased to decrease the low-pressure EGR quantity. The target intake manifold pressure $P_{TGT}$ decreases in response to the variation in the load on the engine 1 or the actual rotation number Ne of the engine 1.

The traditional controlling apparatus, which continues the feedback control of the intake manifold pressure, slightly increases the vane opening such that the actual intake manifold pressure P equals the target intake manifold pressure $P_{TGT}$, as illustrated with the two-dot chain line. Unfortunately, the opening operation of the high-pressure EGR valve 45 at the time $t_1$ introduces a large volume of exhaust gas through the high-pressure EGR path 41 into the intake path 11, due to the high pressure in the exhaust manifold 22 caused by the vane opening controlled to be small until the time $t_1$. The actual intake manifold pressure P decreases with the increase in the high-pressure EGR quantity and reaches the target intake manifold pressure $P_{TGT}$ even when the vane opening is not controlled to be the intended opening.

The low-pressure throttle valve 13 is under the feedback control such that the total EGR quantity equals the total target EGR quantity. In the traditional controlling apparatus, after the time $t_1$, exhaust gas of the total EGR quantity exceeding total target EGR quantity is introduced into the intake system. This phenomenon is accompanied by the increase in the high-pressure EGR quantity. The EGR controller 63 controls the opening of the low-pressure throttle valve 13 toward the open side in order to decrease the low-pressure EGR quantity and thus decrease the total EGR quantity to the total target EGR quantity.

In other words, during the parallel execution of the feedback control of the intake manifold pressure and the EGR control, the high-pressure EGR quantity and the low-pressure EGR quantity are imbalanced, despite the total EGR quantity substantially equal to the total target EGR quantity. Furthermore, an inappropriate vane opening can achieve a stable state, despite the actual intake manifold pressure P substantially equal to the target intake manifold pressure $P_{TGT}$.

In contrast, the present controlling apparatus prohibits the feedback control of the intake manifold pressure and executes the feedforward control at the switching time $t_1$ of the EGR systems from the low-pressure single use to the combination use. In specific, the pressure controller 64 adjusts the vane opening to the predetermined opening ($V_1$ in the drawing) at the time $t_1$, and maintains the predetermined opening until a time $t_2$ when the actual intake manifold pressure P becomes substantially equal to the target intake manifold pressure $P_{TGT}$. In other words, the present controlling apparatus keeps the vane opening constant from the time $t_1$ to the time $t_2$, in contrast to that in the traditional controlling apparatus illustrated with the two-dot chain line. This controlling apparatus then restarts the feedback control of the intake manifold pressure after the time $t_2$. It is noted that the controlling apparatus controls the EGR actuators likewise the traditional controlling apparatus.

The controlling apparatus temporarily prohibits the feedback control of the intake manifold pressure and quickly increases the vane opening, to prevent the introduction of a large volume of exhaust gas through the high-pressure EGR path 41 in response to the opening operation of the high-pressure EGR valve 45. The controlling apparatus thus can achieve the total EGR quantity equal to the total target EGR quantity while maintaining a proper balance between the high-pressure EGR quantity and the low-pressure EGR quantity. Since the feedback control of the intake manifold pressure is restarted after the time $t_2$ when the actual intake manifold pressure P becomes substantially equal to the target intake manifold pressure $P_{TGT}$, the vane opening is at a point $V_2$ upon the restart of the feedback control of the intake manifold pressure. The feedback control of the intake manifold pressure after the time $t_2$ can thus be executed with high accuracy.

The switching of the EGR systems from the high-pressure single use to the combination use during the feedback control of the intake manifold pressure will now be explained. With reference to FIG. 5, in the high-pressure single use until a time $t_3$, the low-pressure EGR valve 55 is fully closed whereas the low-pressure throttle valve 13 is fully open, resulting in a zero low-pressure EGR quantity. The high-pressure EGR valve 45 is fully open, and the opening of the high-pressure throttle valve 14 is under the feedforward control such that the total EGR quantity (i.e., the high-pressure EGR quantity) equals the total target EGR quantity. In addition, the pressure controller 64 executes the feedback control of the intake manifold pressure through adjusting the vane opening such that the actual intake manifold pressure P equals the target intake manifold pressure $P_{TGT}$ in the high-pressure single use until the time $t_3$.

At the switching time $t_3$ of the EGR systems from the high-pressure single use to the combination use in response to a variation in the load on the engine 1 or the actual rotation number Ne of the engine 1, the high-pressure throttle valve 14 is fully opened and the opening of the high-pressure EGR valve 45 is decreased to reduce the high-pressure EGR quantity. In addition, the low-pressure EGR valve 55 is fully opened and the opening of the low-pressure throttle valve 13 is decreased to increase the low-pressure EGR quantity. The target intake manifold pressure $P_{TGT}$ increases in response to the variation in the load on the engine 1 or the actual rotation number Ne of the engine 1.

The traditional controlling apparatus, which continues the feedback control of the intake manifold pressure, slightly decreases the vane opening such that the actual intake manifold pressure P equals the target intake manifold pressure $P_{TGT}$, as illustrated with the two-dot chain line. Unfortunately, the closing operation of the high-pressure EGR valve 45 at the time $t_3$ excessively decreases the flow rate of exhaust gas through the high-pressure EGR path 41 into the intake path 11, due to the relatively low pressure in the exhaust manifold 22 caused by the vane opening controlled to be large until the time $t_3$. The excessive decrease in the flow rate leads to the high-pressure EGR quantity introduced into the intake path 11 lower than desired. The actual intake manifold pressure P increases with the decrease in the high-pressure EGR quantity and reaches the target intake manifold pressure $P_{TGT}$ even when the vane opening is not the intended opening.

The low-pressure throttle valve 13 is under the feedback control such that the total EGR quantity equals the total target EGR quantity. In the traditional controlling apparatus, exhaust gas is introduced into the intake system with the total EGR quantity lower than the total target EGR quantity after the time $t_3$. This phenomenon is accompanied by the decrease in the high-pressure EGR quantity. The EGR controller 63 controls the opening of the low-pressure throttle valve 13 toward the closed side in order to increase the low-pressure EGR quantity and thus increase the total EGR quantity to the total target EGR quantity.

In other words, upon the switching of the high-pressure single use to the combination use during the parallel execution of the feedback control of the intake manifold pressure and the EGR control, the ratio of the high-pressure EGR quantity and the low-pressure EGR quantity is imbalanced, despite the total EGR quantity substantially equal to the total target EGR quantity, as in the switching from the low-pressure single use to the combination use. Furthermore, an inappropriate vane opening can achieve a stable state, despite the actual intake manifold pressure P substantially equal to the target intake manifold pressure $P_{TGT}$.

In contrast, the present controlling apparatus prohibits the feedback control of the intake manifold pressure and executes the feedforward control at the switching time $t_3$ of the EGR systems from the high-pressure single use to the combination use. In specific, the pressure controller 64 adjusts the vane opening to the predetermined opening ($V_3$ in the drawing) at the time $t_3$, and maintains the predetermined opening until a time $t_4$ when the actual intake manifold pressure P becomes substantially equal to the target intake manifold pressure $P_{TGT}$. In other words, the present controlling apparatus keeps the vane opening constant from the time $t_3$ to the time $t_4$, in contrast to that in the traditional controlling apparatus illustrated with the two-dot chain line. This controlling apparatus then restarts the feedback control of the intake manifold pressure after the time $t_4$. It is noted that the controlling apparatus controls the EGR actuators like the traditional controlling apparatus.

The controlling apparatus temporarily prohibits the feedback control of the intake manifold pressure and quickly decreases the vane opening, to prevent an excessive decrease in the flow rate of exhaust gas through the high-pressure EGR path 41 in response to the closing operation of the high-pressure EGR valve 45. The controlling apparatus thus can achieve the total EGR quantity equal to the total target EGR quantity while maintaining a proper balance between the high-pressure EGR quantity and the low-pressure EGR quantity. Since the feedback control of the intake manifold pressure is restarted after the time $t_4$ when the actual intake manifold pressure P becomes substantially equal to the target intake manifold pressure $P_{TGT}$, the vane opening is at a point $V_4$ upon the restart of the feedback control of the intake manifold pressure. The feedback control of the intake manifold pressure after the time $t_4$ can thus be executed with high accuracy.

[5. Advantageous Effects]

The controlling apparatus for the engine 1 according to the embodiment prohibits the feedback control of the intake manifold pressure during the predetermined period from the switching of the EGR systems 40 and 50 from the single use to the combination use, and thus can prevent the interference between the EGR control and the feedback control of the intake manifold pressure during the period. The controlling apparatus executes the feedforward control of the intake manifold pressure during the predetermined period from the switching from the single use to the combination use, so that the actual intake manifold pressure P rapidly approaches the target intake manifold pressure $P_{TGT}$.

In addition, the continuous EGR control can maintain the proper balance between the high-pressure EGR quantity and the low-pressure EGR quantity. In other words, the controlling apparatus can appropriately execute the feedback control of the intake manifold pressure and the EGR control while maintaining the balance between exhaust gas flowing in the high-pressure EGR path 41 and exhaust gas flowing in the low-pressure EGR path 51. The proper balance between the high-pressure EGR quantity and the low-pressure EGR quantity can adjust the temperature of intake air to a temperature suitable for improving the exhaust performance, leading to high exhaust performance.

The controlling apparatus restarts the feedback control of the intake manifold pressure if the absolute value of the difference between the actual intake manifold pressure P detected with the pressure sensor 65 and the target intake manifold pressure $P_{TGT}$ calculated by the calculator 62 becomes equal to or smaller than the predetermined value $P_0$, and thus can execute the subsequent feedback control with high accuracy.

In the feedforward control of the intake manifold pressure during the period of prohibiting the feedback control of the intake manifold pressure, the controlling apparatus adjusts the opening of the variable vanes 33 to the target vane opening corresponding to the predetermined target intake manifold pressure $P_{TGT}$. The actual intake manifold pressure thus can rapidly reach the target intake manifold pressure $P_{TGT}$ after the switching from the single use to the combination use with the simple control configuration.

The controlling apparatus merely temporarily prohibits the feedback control of the intake manifold pressure during the predetermined period from the switching of the EGR systems from the single use to the combination use, and can continue the EGR control during the period, leading to high exhaust performance. The controlling apparatus can execute the EGR control and the feedback control of the intake manifold pressure in parallel in response to the operating state other than during the predetermined period, leading to both high exhaust performance and high output torque of the engine.

[6. Other Modifications]

The above-described embodiments should not be construed to limit the invention and may be modified in various manners without departing from the gist of the invention.

For example, the period of prohibiting the feedback control of the intake manifold pressure starts upon the switching of the EGR systems from the single use to the combination use in the above embodiment. The condition for starting the prohibition period may also include "a variation in load on the engine 1 upon the switching equal to or larger than a predetermined load." In other words, the controlling apparatus may prohibit the feedback control of the intake manifold pressure and execute the feedforward control of the intake manifold pressure only if the load significantly varies upon the switching of the EGR systems from the single use to the combination use.

A large variation in load on the engine 1 often leads to significant variations in the target intake manifold pressure $P_{TGT}$ and the target vane opening under the feedforward control, which readily results in an imbalance between the recirculation systems 40 and 50. In specific, the high-pressure EGR quantity readily varies more significantly than expected in this case. The feedback control of the intake manifold pressure is thus prohibited only in such a case without excessive prohibition.

The beginning of the period of prohibiting the feedback control of the intake manifold pressure indicates the moment when the EGR systems are switched from the single use to the combination use in the above embodiment. Alternatively, the feedback control of the intake manifold pressure may be prohibited slightly later than the switching to the combination use instead of upon the switching. In other words, a time lag may be set between the switching and the prohibition of the feedback control of the intake manifold pressure.

In the feedforward control according to the above embodiment, the target vane opening is set to a constant value corresponding to the target intake manifold pressure $P_{TGT}$, and is linearly controlled as illustrated in FIGS. 4 and 5. The target value (target vane opening) in the feedforward control may also be any value other than such a constant value. The controlling apparatus only has to prohibit the feedback control of the intake manifold pressure during the predetermined period from the switching and adjust the vane opening to some target value.

The above-described condition for returning from the feedforward control of the intake manifold pressure to the feedback control of the intake manifold pressure is given for illustration. For example, the controlling apparatus may return to the feedback control of the intake manifold pressure after the lapse of a predetermined time from the switching measured with a timer. In addition, although the predetermined value $P_0$ is zero in the above embodiment, the predetermined value $P_0$ may be any value equal to or larger than zero. Furthermore, the target intake manifold pressure $P_{TGT}$ and the actual intake manifold pressure P may be directly compared with each other instead of the calculation of their difference.

The above-explained procedures for activating the EGR actuators are given for illustration. For example, the low-pressure EGR quantity may be controlled through the adjustment of the opening of the low-pressure EGR valve 55, or through the adjustment of the openings of both the low-pressure EGR valve 55 and the low-pressure throttle valve 13, instead of the feedback control of the opening of the low-pressure throttle valve 13. The high-pressure EGR quantity may be controlled through the adjustment of the opening of the high-pressure EGR valve 45, or through the adjustment of the openings of both the high-pressure EGR valve 45 and the high-pressure throttle valve 14, instead of the feedforward control of the opening of the high-pressure throttle valve 14. In addition, the high-pressure EGR quantity may be under the feedback control, and the low-pressure EGR quantity may be under the feedforward control.

The variable geometry turbocharger 30 may be a VG/VD turbocharger including a compressor 31 with a variable flow rate without the variable vanes 33 around the turbine 32.

Although the intake manifold pressure is used as an intake-system pressure in the above embodiment, the intake manifold pressure may be replaced with the pressure in a position in the intake system downstream of the compressor 31. In other words, the pressure sensor 65 may be disposed in a portion of the intake path 11 upstream of the surge tank 15, instead of in the surge tank 15.

Although the usage state of the EGR systems and the execution of the feedback control of the intake manifold pressure are determined in response to the actual rotation number Ne and the load, the actual rotation number Ne may be replaced with the angle θ of rotation of the crankshaft or the rate of change in the angle θ of rotation per unit time (angular velocity ω), and the load may be replaced with the accelerator position A.

REFERENCE SIGNS LIST 1 diesel engine (engine)
11 intake path
13 low-pressure throttle valve (second adjuster)
14 high-pressure throttle valve (first adjuster)
16 intake manifold
21 exhaust path
30 variable geometry (VG) turbocharger
31 compressor
32 turbine
33 variable vanes (vanes)
40 high-pressure EGR loop (first recirculation system)
41 high-pressure EGR path (first path)
45 high-pressure EGR valve (first adjuster)
50 low-pressure EGR loop (second recirculation system)
51 low-pressure EGR path (second path)

55 low-pressure EGR valve (second adjuster)
60 electrical control unit (ECU)
61 determiner
62 calculator
63 EGR controller (recirculation controller)
64 pressure controller
65 pressure sensor

The invention claimed is:

1. A controlling apparatus for an engine, comprising:
a variable geometry turbocharger including a turbine disposed in an exhaust path, a compressor disposed in an intake path, and vanes for adjusting a flow rate;
a first recirculation system including a first adjusting valve that adjusts a flow rate of exhaust gas in a first path, the first path connecting an upstream position of the turbine to a downstream position of the compressor;
a second recirculation system including a second adjusting valve that adjusts a flow rate of exhaust gas in a second path, the second path connecting a downstream position of the turbine to an upstream position of the compressor;
a processor and a memory device storing instructions that causes the processor to:
switch, as a recirculation controller, between a single use and a combination use by controlling the first adjusting valve and the second adjusting valve in response to an operating state of a vehicle, the single use activating one of the first recirculation system and the second recirculation system, the combination use activating both the first recirculation system and the second recirculation system; and
execute, as a pressure controller, a feedback control of an intake-system pressure in the downstream position of the compressor through adjustment of an opening of the vanes in response to the operating state, wherein
the pressure controller prohibits the feedback control and executes a feedforward control of the intake-system pressure every time switching from the single use to the combination use by the recirculation controller occurs, and continues the feedforward control for a predetermined period from the switching.

2. The controlling apparatus according to claim 1, wherein the recirculation controller executes a feedforward control on the first adjusting valve in a high-pressure single use and the combination use, the high-pressure single use activating the first recirculation system alone.

3. The controlling apparatus according to claim 1, wherein the pressure controller adjusts the opening of the vanes to a target vane opening corresponding to a target pressure of the intake-system pressure in the feedforward control, the target vane opening corresponding to the target pressure of the intake-system pressure being preliminarily determined in response to the operating state.

4. The controlling apparatus according to claim 3, wherein the recirculation controller executes a feedforward control on the first adjusting valve in a high-pressure single use and the combination use, the high-pressure single use activating the first recirculation system alone.

5. The controlling apparatus according to claim 1, wherein if a variation in load on the engine upon the switching from the single use to the combination use by the recirculation controller is equal to or larger than a predetermined load, the pressure controller prohibits the feedback control and executes the feedforward control of the intake-system pressure.

6. The controlling apparatus according to claim 5, wherein the recirculation controller executes a feedforward control on the first adjusting valve in a high-pressure single use and the combination use, the high-pressure single use activating the first recirculation system alone.

7. The controlling apparatus according to claim 5, wherein the pressure controller adjusts the opening of the vanes to a target vane opening corresponding to a target pressure of the intake-system pressure in the feedforward control, the target vane opening corresponding to the target pressure of the intake-system pressure being preliminarily determined in response to the operating state.

8. The controlling apparatus according to claim 7, wherein the recirculation controller executes a feedforward control on the first adjusting valve in a high-pressure single use and the combination use, the high-pressure single use activating the first recirculation system alone.

9. The controlling apparatus according to claim 1, further comprising:
a pressure sensor to detect the intake-system pressure, wherein
the memory device further stores instructions that cause the processor to:
calculate, as a calculator, a target pressure of the intake-system pressure in response to the operating state, wherein
if an absolute value of a difference between the intake-system pressure detected with the pressure sensor and the target pressure calculated by the calculator becomes equal to or smaller than a predetermined value, the pressure controller restarts the feedback control.

10. The controlling apparatus according to claim 9, wherein the recirculation controller executes a feedforward control on the first adjusting valve in a high-pressure single use and the combination use, the high-pressure single use activating the first recirculation system alone.

11. The controlling apparatus according to claim 9, wherein the pressure controller adjusts the opening of the vanes to a target vane opening corresponding to the target pressure of the intake-system pressure in the feedforward control, the target vane opening corresponding to the target pressure of the intake-system pressure being preliminarily determined in response to the operating state.

12. The controlling apparatus according to claim 11, wherein the recirculation controller executes a feedforward control on the first adjusting valve in a high-pressure single use and the combination use, the high-pressure single use activating the first recirculation system alone.

13. The controlling apparatus according to claim 9, wherein if a variation in load on the engine upon the switching from the single use to the combination use by the recirculation controller is equal to or larger than a predetermined load, the pressure controller prohibits the feedback control and executes the feedforward control of the intake-system pressure.

14. The controlling apparatus according to claim 13, wherein the recirculation controller executes a feedforward control on the first adjusting valve in a high-pressure single use and the combination use, the high-pressure single use activating the first recirculation system alone.

15. The controlling apparatus according to claim 13, wherein the pressure controller adjusts the opening of the vanes to a target vane opening corresponding to the target pressure of the intake-system pressure in the feedforward control, the target vane opening corresponding to the target pressure of the intake-system pressure being preliminarily determined in response to the operating state.

16. The controlling apparatus according to claim 15, wherein the recirculation controller executes a feedforward control on the first adjusting valve in a high-pressure single use and the combination use, the high-pressure single use activating the first recirculation system alone.

17. A controlling apparatus for an engine, comprising:
- a variable geometry turbocharger including a turbine disposed in an exhaust path, a compressor disposed in an intake path, and vanes for adjusting a flow rate;
- a first recirculation system including a first adjusting valve that adjusts a flow rate of exhaust gas in a first path, the first path connecting an upstream position of the turbine to a downstream position of the compressor;
- a second recirculation system including a second adjusting valve that adjusts a flow rate of exhaust gas in a second path, the second path connecting a downstream position of the turbine to an upstream position of the compressor;
- a processor and a memory device storing instructions that causes the processor to:
- switch, as a recirculation controller, between a single use and a combination use by controlling the first adjusting valve and the second adjusting valve in response to an operating state of a vehicle, the single use activating one of the first recirculation system and the second recirculation system, the combination use activating both the first recirculation system and the second recirculation system; and
- execute, as a pressure controller, a feedback control of an intake-system pressure in the downstream position of the compressor through adjustment of an opening of the vanes in response to the operating state, wherein
the pressure controller prohibits the feedback control and executes a feedforward control of the intake-system pressure during a predetermined period from switching from the single use to the combination use by the recirculation controller, and
the recirculation controller executes a feedforward control on the first adjusting valve in a high-pressure single use and the combination use, the high-pressure single use activating the first recirculation system alone.

* * * * *